US008289173B2

(12) United States Patent
Ben-Mansour et al.

(10) Patent No.: US 8,289,173 B2
(45) Date of Patent: Oct. 16, 2012

(54) LEAK DETECTION BAND

(75) Inventors: Rached Ben-Mansour, Dhahran (SA); Khaled Mezghani, Dhahran (SA)

(73) Assignee: King Fahd University of Petroleum and Minerals, Dhahran (SA)

(*) Notice: Subject to any disclaimer, the term of this patent is extended or adjusted under 35 U.S.C. 154(b) by 341 days.

(21) Appl. No.: 12/656,989

(22) Filed: Feb. 22, 2010

(65) Prior Publication Data
US 2011/0205072 A1    Aug. 25, 2011

(51) Int. Cl.
G08B 21/00    (2006.01)
(52) U.S. Cl. ........... 340/605; 340/572.8; 73/49.1; 73/46
(58) Field of Classification Search .................. 340/605, 340/525, 572.1, 572.8; 73/49.1, 46, 31.05, 73/23.2, 40.5 R, 49.5; 138/104; 137/15.11
See application file for complete search history.

(56) References Cited

U.S. PATENT DOCUMENTS

| 3,485,085 | A | 12/1969 | Hawkins, Jr. |
| 4,996,879 | A | 3/1991 | Kruka et al. |
| 5,058,421 | A | 10/1991 | Alexander et al. |
| 5,101,657 | A | 4/1992 | Lahlouh et al. |
| 5,315,291 | A | 5/1994 | Furr |
| 5,341,128 | A | 8/1994 | Keyser et al. |
| 5,357,241 | A | 10/1994 | Welch, Jr. et al. |
| 5,440,917 | A | 8/1995 | Smith et al. |
| 5,675,506 | A | 10/1997 | Savic |
| 5,920,265 | A | 7/1999 | Johnson, Jr. et al. |
| 5,974,862 | A | 11/1999 | Lander et al. |
| 6,147,613 | A * | 11/2000 | Doumit ........................... 340/605 |
| 6,530,263 | B1 | 3/2003 | Chana |
| 6,639,517 | B1 | 10/2003 | Chapman et al. |
| 6,826,948 | B1 * | 12/2004 | Bhatti et al. ................ 73/40.5 R |
| 6,865,941 | B2 * | 3/2005 | Gibbs ........................ 73/40.5 R |
| 7,362,230 | B1 | 4/2008 | Fish |
| 7,387,012 | B2 * | 6/2008 | Spaolonzi et al. ............. 73/49.1 |
| 2002/0124633 | A1 | 9/2002 | Yang et al. |
| 2002/0134140 | A1 | 9/2002 | Baumoel |
| 2003/0167847 | A1 | 9/2003 | Brown et al. |
| 2004/0128034 | A1 | 7/2004 | Lenker et al. |
| 2005/0246112 | A1 | 11/2005 | Abhulimen et al. |
| 2006/0137090 | A1 | 6/2006 | Jeffries et al. |
| 2006/0174707 | A1 | 8/2006 | Zhang |
| 2007/0051165 | A1 | 3/2007 | Maresca et al. |
| 2008/0066812 | A1 | 3/2008 | Tornay |
| 2008/0133063 | A1 | 6/2008 | Bisson et al. |

FOREIGN PATENT DOCUMENTS

| CA | 2621035 | 4/2007 |
| GB | 2364126 | 1/2002 |
| WO | WO 2004031719 | 4/2004 |

* cited by examiner

Primary Examiner — Anh V La
(74) Attorney, Agent, or Firm — Richard C. Litman

(57) ABSTRACT

The leak detection band is mounted about a pipe joint for generating an alert signal when a liquid leak from the pipe joint is detected. The leak detection band includes an annular mount having a pair of opposed annular edges and an annular recess formed in an interior surface thereof adjacent one of the annular edges. A transmitter is attached to the annular mount, and a pair of substantially semicircular leads are provided. Each lead has opposed first and second ends and a central portion. The first ends are electrically connected to the transmitter. The second ends and central portions are disposed within the recess so that the second ends are mounted opposite one another with a gap being formed therebetween. When a conductive liquid leaks from the pipe joint, the conductive liquid fills the gap, closing a transmitting circuit, causing the transmitter to transmit an alert signal.

15 Claims, 6 Drawing Sheets

LEAK DETECTION BAND

BACKGROUND OF THE INVENTION

1. Field of the Invention

The present invention relates generally to water distribution and plumbing pipes, and particularly to a leak detection band adapted for mounting about a pipe joint for generating an alert signal when a liquid leak from the pipe joint is detected.

2. Description of the Related Art

Water leaks in water distribution networks in cities underground, homes and businesses cause a tremendous amount of damage to structures and contents. Leaks generally occur in pipe networks due to corrosion, bad workmanship or failed parts. If an occupant is present and the leak is easily visible, water damage can often be prevented. However, many leaks occur under roads, bridges or buildings, behind cabinets and in the walls so that even if workers or an occupant are present, the leaks may not be discovered until a very substantial amount of damage has been caused. It is not uncommon for an undetected leak to literally create havoc and require major reconstruction to return the damaged infrastructure, such as roads and buildings, to a usable state. Moreover, leaks induce the growth of hazardous mold.

Typical conventional pipeline leak detection systems are relatively inefficient in terms of response time, sensitivity, robustness and cost. Pipeline leaks are typically detected by observation of the external effects of the spill, or by monitoring and analysis of the internal hydraulics of the pipeline. Neither of these methods provides real-time monitoring of the leak itself, only the indirect effects of a leak. A pipeline leak detection system to alert operators is desired so that the size of the spill can be limited, thus providing rapid detection, as well as reliability and sensitivity.

Thus, a leak detection band solving the aforementioned problems is desired.

SUMMARY OF THE INVENTION

The leak detection band is adapted for mounting about a pipe joint for generating an alert signal when a liquid leak from the pipe joint is detected. The leak detection band includes an annular mount adapted for mounting about the pipe joint. The annular mount has a pair of opposed annular edges, with an annular recess being formed in an interior surface of the annular mount adjacent one of the annular edges thereof.

A transmitter is secured to the annular mount, and a pair of substantially semicircular leads are further provided. Each substantially semicircular lead has opposed first and second ends and a central portion, with the first ends thereof being in electrical communication with the transmitter. The second ends and central portions thereof are received within the annular recess so that the second ends are mounted adjacent one another within the annular recess, with a gap being formed therebetween. In use, if an electrically conductive liquid leaks from the pipe joint, the electrically conductive liquid fills the gap formed between the second ends of the pair of substantially semicircular leads, thus closing a transmitting circuit formed by the transmitter and the leads, causing the transmitter to transmit an alert signal to a remote user or receiver.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
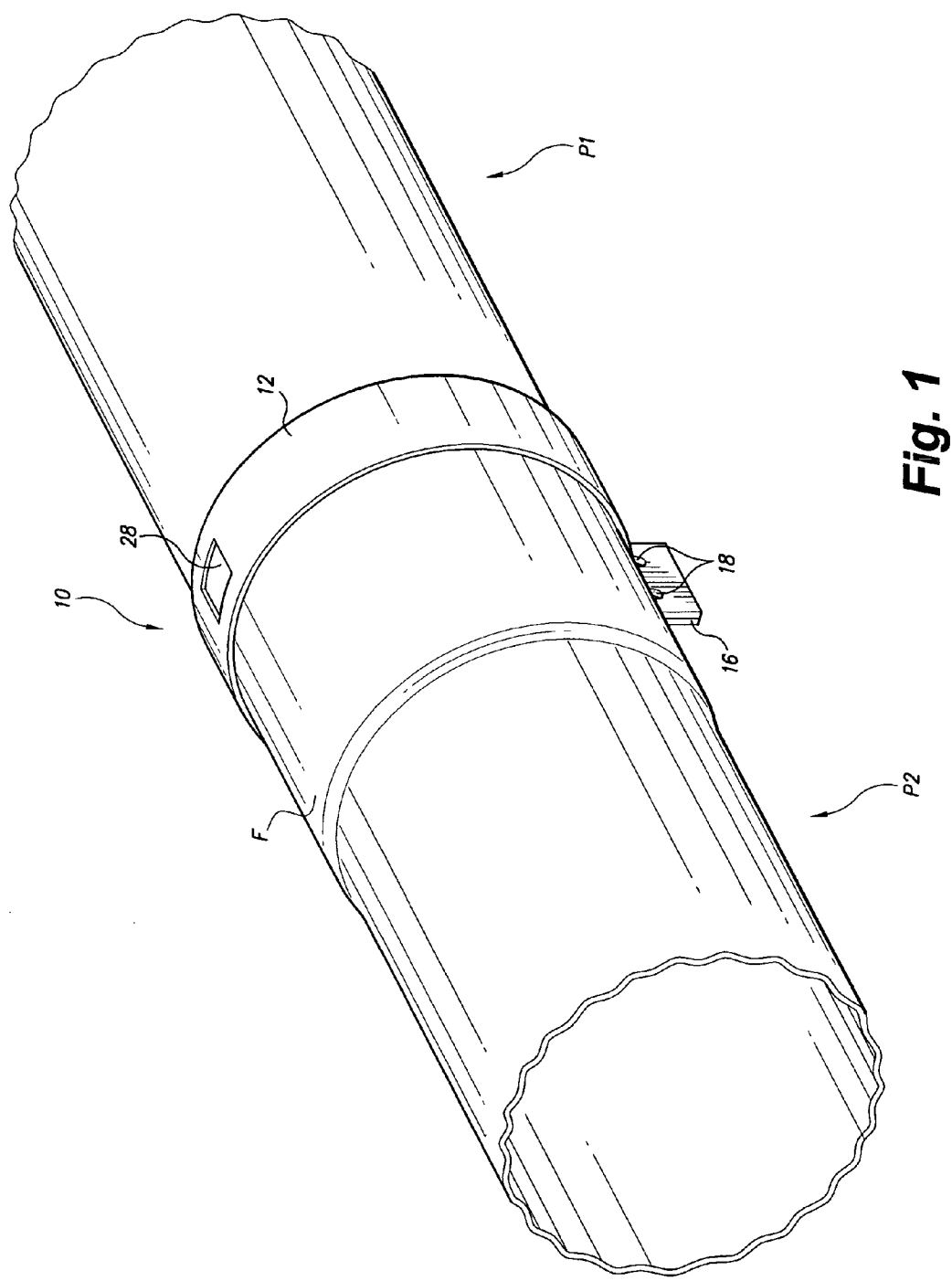
FIG. 1 is an environmental perspective view of a first embodiment of a leak detection band according to the present invention.
Figure 2:
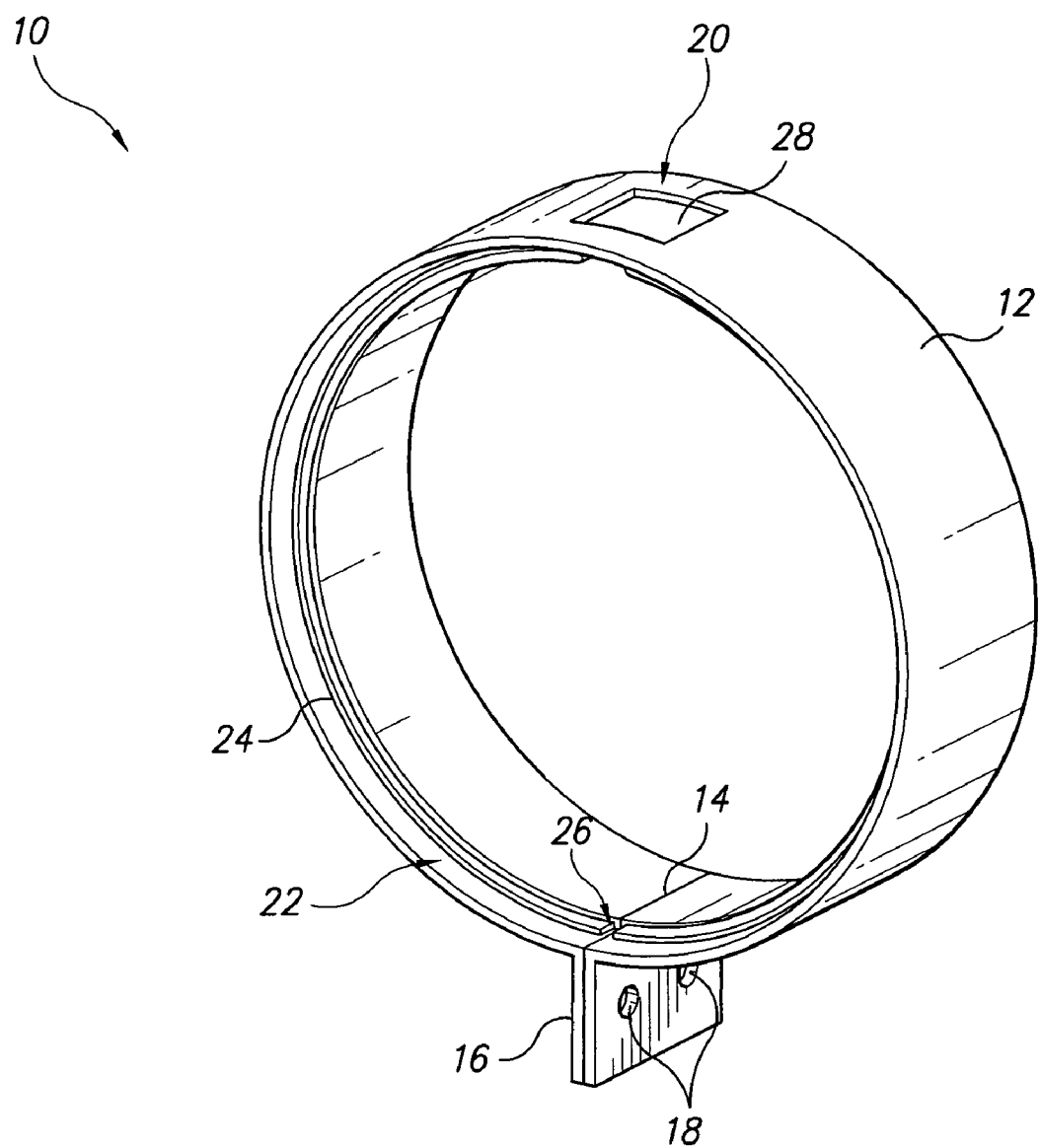
FIG. 2 is a perspective view of the leak detection band of FIG. 1.
Figure 3:
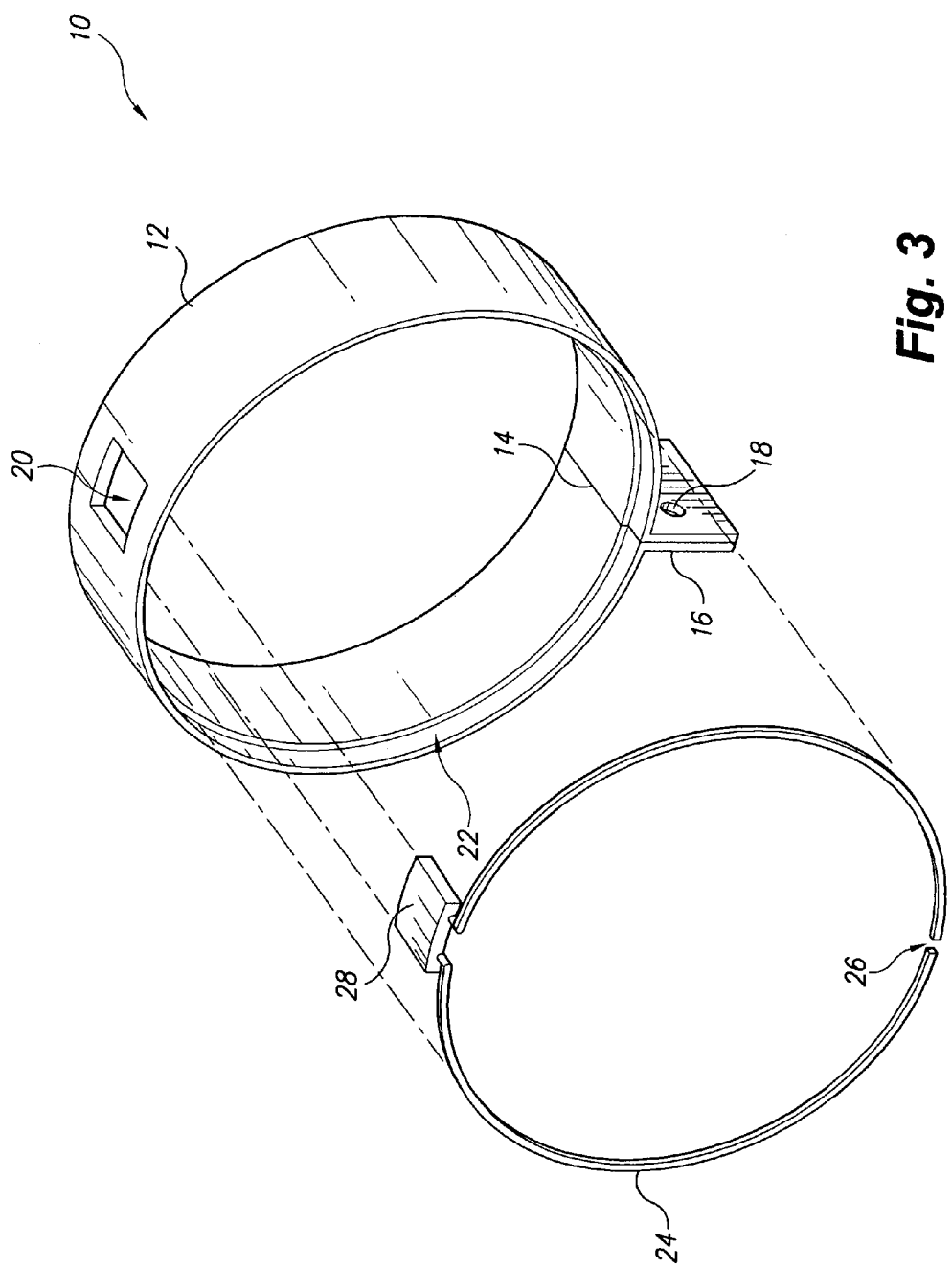
FIG. 3 is a partially exploded perspective view of the leak detection band of FIG. 1.

Referring to FIGS. 1-3, the leak detection band 10 is adapted for mounting about a pipe joint formed between exemplary lengths of pipe $P_1$ and $P_2$. In FIG. 1, pipe $P_2$ has a fitting F at one end that defined an internal shoulder, the fitting having a larger inside diameter than the outside diameter of pipe $P_1$ so that the end of pipe $P_1$ slides into the fitting F and abuts the fitting's internal shoulder, and is sealed with solder, PVC cement, or the like to form the pipe joint. Over time, the solder or cement may deteriorate, causing the pipe joint to leak. The band 10 generates an alert signal when a liquid leak from the pipe joint is detected. The leak detection band includes an annular mount 12 or band clamp adapted for mounting about the pipe joint. The annular mount 12 has a pair of opposed annular edges, with an annular recess 22 being formed in an interior surface of the annular mount 12 adjacent one of the annular edges thereof.

The annular mount 12 is preferably formed from a relatively flexible and resilient material, preferably plastic or other electrically nonconductive material, allowing it to be secured about the pipe joint and adjusted to a snug fit therearound. It should be understood that the annular mount 12 may be manufactured in wide variety of sizes for mounting about a variety of pipes, tubes and the like. Preferably, a slit 14 is formed through the annular mount 12, as shown, with the slit 14 extending substantially along an axial direction of the annular mount 12. The slit 14 allows the semicylindrical halves of the annular mount 12 to be separated at the slit 14 so that the annular mount 12 may be fixed about, or removed from, the pipe joint.

As shown, a pair of tabs 16 are preferably provided extending from a respective semicylindrical half of the annular mount 12 at the slit 14. Each tab 16 has at least one aperture 18 formed therethrough so that a lock, a locking pin or other fastener may be used to secure the annular mount 12 about the pipe joint. It should be understood that any suitable type of fastener may be used to secure the annular mount 12 about the pipe joint, such as a bolt and nut, a rivet, or the like.

Figure 8:
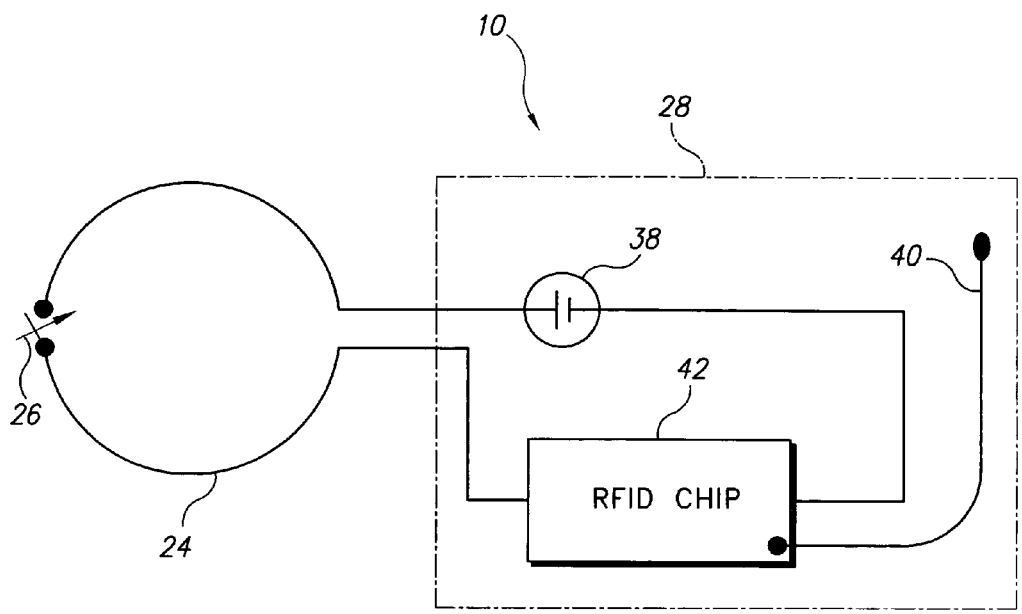
FIG. 8 is a schematic diagram of a transmitter of a leak detection band according to the present invention.

A transmitter 28 is secured to the annular mount 12 and a pair of substantially semicircular leads 24 are further provided. Although it should be understood that any suitable type of transmitter 28 may be utilized, in the preferred embodiment, as shown in FIG. 8, the transmitter 28 preferably includes a radio frequency identification (RFID) chip 42 or the like, a battery 38 or other suitable source of electrical power in electrical communication with the radio frequency identification chip 42, and an antenna 40 in electrical communication with the radio frequency identification chip 42.

Figure 9A:
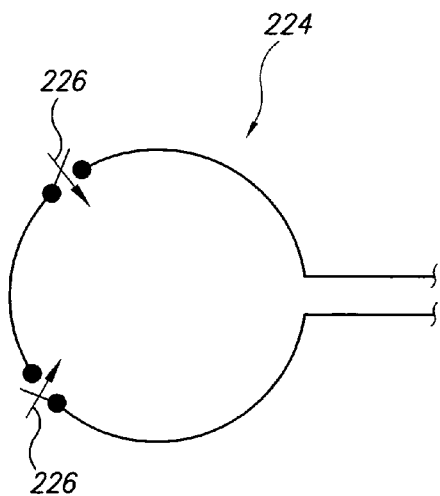
FIG. 9A is a schematic diagram of an alternative set of electrical leads of a leak detection band according to the present invention.
Figure 9B:
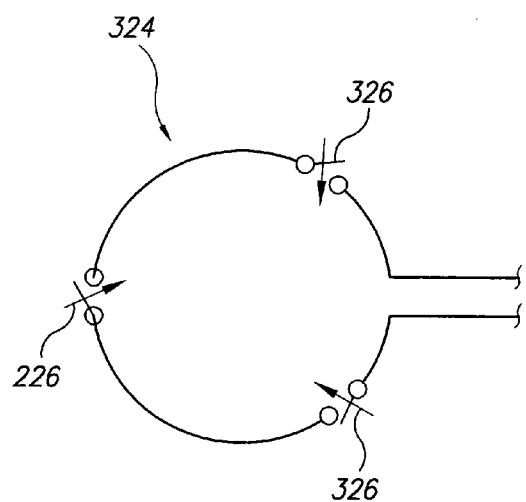
FIG. 9B is a schematic diagram of another alternative set of electrical leads of the leak detection band according to the present invention.

Each substantially semicircular lead 24 has opposed first and second ends and a central portion, with the first ends being electrically connected to the transmitter 28. The second ends and central portions thereof are disposed in the annular recess 22 with the second ends disposed opposite one another within the annular recess, the second ends being separated by a small gap 26. In the alternative embodiments of FIGS. 9A and 9B, multiple gaps 226, 326 are shown being formed in leads 224, 324, respectively. It should be understood that any suitable number of gaps may be utilized. The use of multiple gaps allows the user to assess leak strength or avoid false leak alarms, such as those that may be caused by humid soil or the like.

Figure 4:
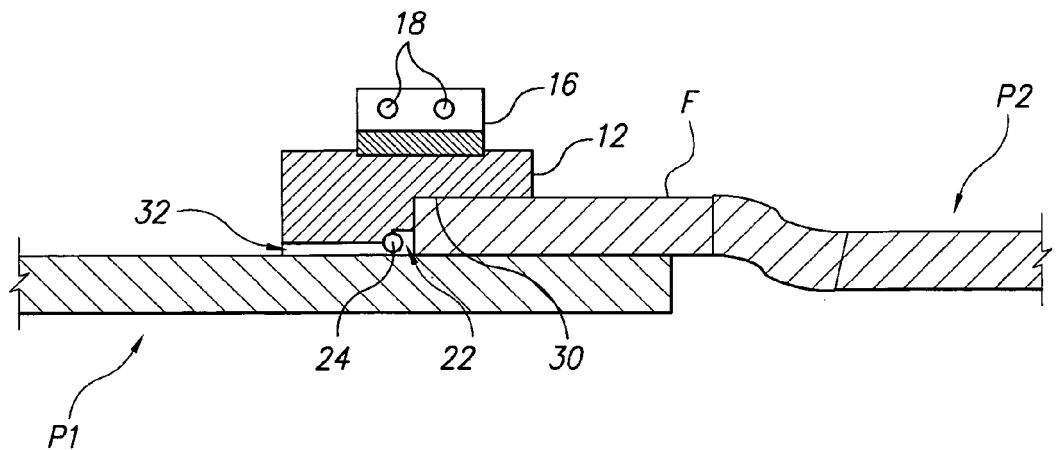
FIG. 4 is a partial side view in section of the leak detection band of FIG. 1.

As shown, an opening 20 is preferably formed through the annular mount 12, with the transmitter 28 being positioned in the opening 20, providing an unobstructed path for the transmission of an alert signal upon detection of a leak. Additionally, as shown in FIG. 4, a secondary annular recess 30 defining a shoulder may be formed in the interior surface of the annular mount 12 to form a stop for the fitting F. The secondary annular recess 30 preferably has a substantially L-shaped cross-sectional contour, as shown, for mating with the L-shaped step formed by the joint between exemplary pipes $P_1$ and $P_2$. It should be understood that the secondary annular recess 30 may be dimensioned and configured to snugly mate with any joint formed between two specific lengths of pipe.

Since the water carried by the pipes includes impurities, such as salts, thus making the liquid electrically conductive, the electrically conductive liquid fills the gap 26 formed between the second ends of the pair of substantially semicircular leads 24, thus closing a transmitting circuit formed by the transmitter 28 and the leads 24, causing the transmitter to transmit an alert signal to a remote user or receiver.

Figure 5:
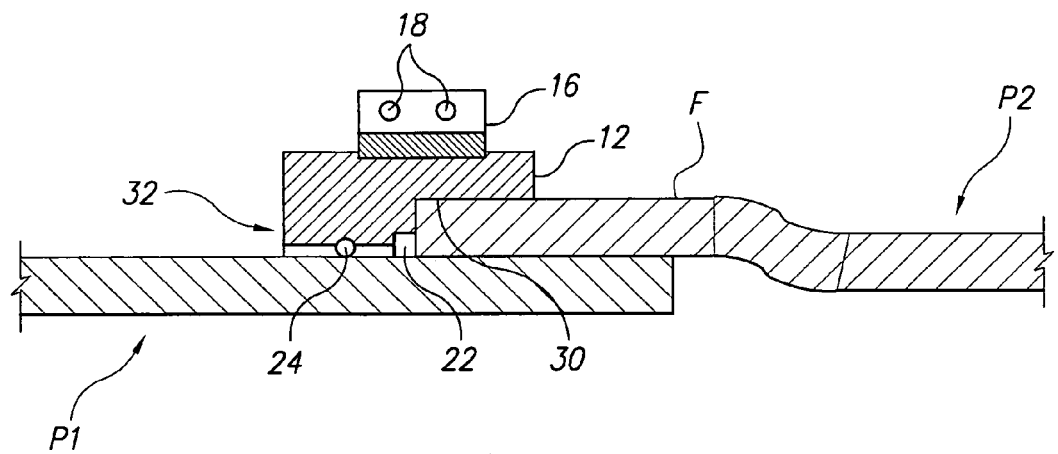
FIG. 5 is a partial side view in section of a second embodiment of a leak detection band according to the present invention.

As shown in FIG. 4, a liquid leak channel 32 is preferably defined between the pipe joint, the annular recess 22 and the adjacent annular edge of the annular mount 12 or band clamp. In the embodiment of FIG. 4, the substantially semicircular leads 24 are positioned within the annular recess 22, adjacent the liquid leak channel 32, and the entire diameter of the leads 24 are exposed to any leak between the pipe $P_1$ and the fitting F. In the alternative embodiment of FIG. 5, the substantially semicircular leads 24 are positioned substantially centrally within the liquid leak channel 32, with an arcuate or radial portion of the leads 24 snugly fitting in a niche defined in the mount 12 so that only a portion of the diameter of the leads 24 is exposed to the leak.

Figure 6:
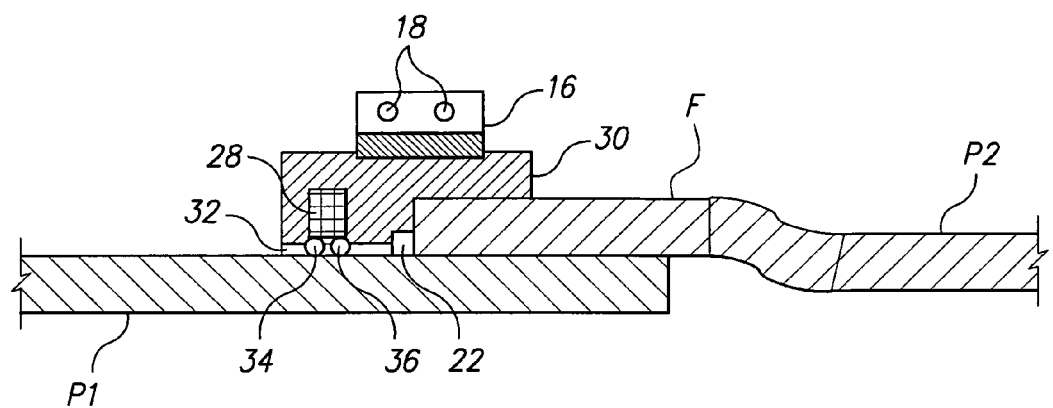
FIG. 6 is a partial side view in section of a third embodiment of a leak detection band according to the present invention.

A further alternative is illustrated in FIG. 6. In this embodiment, the substantially semicircular leads 24 of FIGS. 1-3, 4 and 5 are replaced by relatively short, substantially linear leads 34, 36. Transmitter 28 is embedded, or otherwise mounted, within annular mount 12, adjacent the liquid leak channel 32, so that the leads 34, 36 may be positioned directly within the liquid leak channel 32. As in the previous embodiments, a gap is formed therebetween, as shown, so that any liquid leaking from the pipe joint closes the transmitting circuit (it is assumed that any water in the pipes P1 and P2 has sufficient electrolyte content to conduct electricity across the gap).

Figure 7:
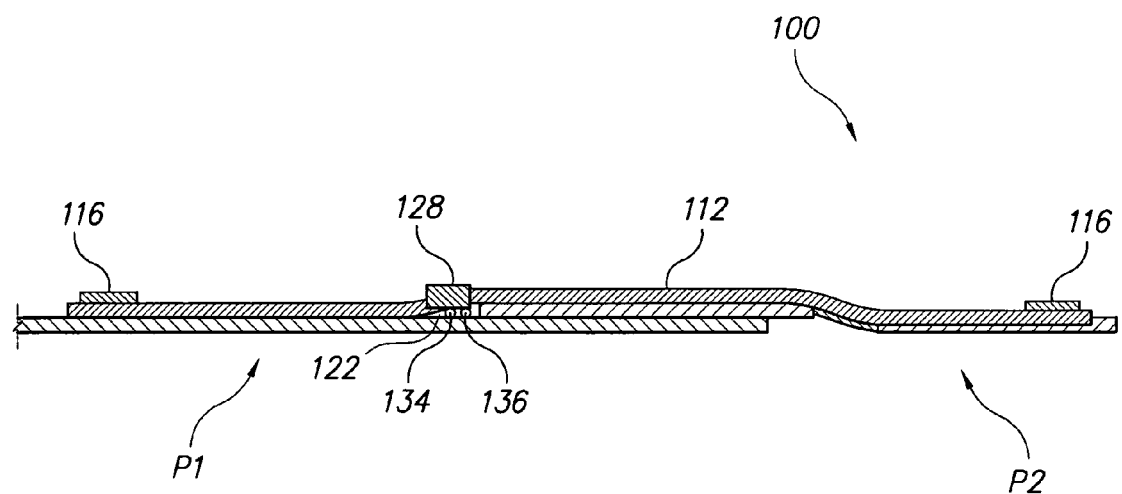
FIG. 7 is a partial side view in section of a fourth embodiment of a leak detection band according to the present invention.

It should be understood that the annular mount 12 may be specifically dimensioned and configured to fit over a particular pair of pipes forming the pipe joint. In FIG. 7, pipes $P_1$ and $P_2$ are pipes that are relatively thin, thus providing a pipe joint with a substantially different profile than that shown in the previous embodiments. Leak detection band 100 includes an annular mount 112 formed as a relatively long, flexible sleeve, thus providing a snug and secure fit about the pipe joint. Annular mount 112 is secured, at either end, by a pair of clamps 116 or the like, and includes a transmitter 128 with a pair of leads 134, 136 extending therefrom, the leads 134, 136 being positioned within an annular recess 122, similar to that described above with regard to the embodiments of FIGS. 4 and 6.

It is to be understood that the present invention is not limited to the embodiments described above, but encompasses any and all embodiments within the scope of the following claims.

We claim:

1. A leak detection band, comprising:
an annular mount adapted for mounting about a pipe joint, the annular mount having a pair of opposed annular edges and an annular recess formed in an interior surface of the annular mount adjacent one of the annular edges;
a transmitter attached to the annular mount; and
a pair of substantially semicircular leads, each of the leads having opposed first and second ends and a central portion, the first ends being electrically connected to the transmitter, the second ends and central portions being disposed within the annular recess and being circumferentially aligned with respect to the annular recess, with the second ends being positioned opposite one another and separated circumferentially with respect to the annular mount by an open gap forming an open circuit so that when water leaks from the pipe joint, the water closes the open circuit, causing a circuit in the transmitter to transmit an alert signal.

2. The leak detection band as recited in claim 1, wherein said transmitter comprises:
a radio frequency identification chip;
a battery in electrical communication with the radio frequency identification chip; and
an antenna in electrical communication with the radio frequency identification chip.

3. The leak detection band as recited in claim 1, wherein said annular mount has a slit formed therethrough, the slit extending substantially along an axial direction.

4. The leak detection band as recited in claim 3, further comprising means for securing said annular mount about the pipe joint.

5. The leak detection band as recited in claim 1, wherein an opening is formed through said annular mount, said transmitter secured in the opening.

6. The leak detection band as recited in claim 1, wherein said annular mount has a secondary annular recess formed in the interior surface, the second annular recess forming a stop for a fitting at an end of a pipe forming part of the pipe joint.

7. The leak detection band as recited in claim 6, wherein the pipe joint, the annular recess and the adjacent annular edge define an axially extending, open liquid leak channel therebetween.

8. The leak detection band as recited in claim 7, wherein the pair of substantially semicircular leads extend into the liquid leak channel.

9. A leak detection band, comprising:
a band clamp adapted for mounting about a pipe joint, the band clamp having a pair of opposed annular edges, a first annular recess being formed in an interior surface of said band clamp adjacent one of the annular edges thereof, a second annular recess being formed in the interior surface of said band clamp in the opposite annular edge adapted for receiving a fitting at an end of one of the pipes;
a transmitter attached to the band clamp; and
a pair of substantially semicircular leads, each of the leads having opposed first and second ends and a central portion, the first ends being electrically connected to a circuit in the transmitter, the second ends and central portions being disposed within the annular recess and being circumferentially aligned with respect to the annular recess, so that the second ends are disposed opposite one another within the annular recess and separated circumferentially with respect to the band clamp by an open gap forming an open in the circuit so that when water leaks from the pipe joint, the water fills the gap formed between the second ends of the pair of substantially semicircular leads, thus closing a transmitting circuit and causing said transmitter to transmit an alert signal.

10. The leak detection band as recited in claim 9, wherein said transmitter comprises:
a radio frequency identification chip;
a battery in electrical communication with the radio frequency identification chip; and
an antenna in electrical communication with the radio frequency identification chip.

11. The leak detection band as recited in claim 9, further comprising means for securing said band clamp about the pipe joint.

12. The leak detection band as recited in claim 9, wherein said band clamp has a secondary annular recess formed in the interior surface, the second annular recess forming a stop for a fitting at an end of a pipe forming part of the pipe joint.

13. The leak detection band as recited in claim 12, wherein the pipe joint, the annular recess and the adjacent annular edge define an axially extending, open liquid leak channel therebetween.

14. The leak detection band as recited in claim 13, wherein the pair of substantially semicircular leads extend into the liquid leak channel.

15. A leak detection band, consisting of:
an annular mount adapted for mounting about a pipe joint, the annular mount having a pair of opposed annular edges and an annular recess formed in an interior surface of the annular mount adjacent one of the annular edges;
a transmitter attached to the annular mount; and
a pair of substantially semicircular leads, each of the leads having opposed first and second ends and a central portion, the first ends being electrically connected to the transmitter, the second ends and central portions being disposed within the annular recess and being circumferentially aligned with respect to the annular recess, with the second ends being positioned opposite one another and separated circumferentially with respect to the annular mount by an open gap forming an open circuit so that when water leaks from the pipe joint, the water closes the open circuit, causing a circuit in the transmitter to transmit an alert signal.

\* \* \* \* \*